United States Patent
Hutton

(10) Patent No.: US 7,428,765 B2
(45) Date of Patent: Sep. 30, 2008

(54) PASSENGER BOARDING BRIDGE STABILIZING APPARATUS AND METHOD THEREFOR

(75) Inventor: Neil Hutton, Ottawa (CA)

(73) Assignee: DEW Engineering and Development Limited, Ottawa, Ontario (CA)

( * ) Notice: Subject to any disclaimer, the term of this patent is extended or adjusted under 35 U.S.C. 154(b) by 264 days.

(21) Appl. No.: 11/266,171

(22) Filed: Nov. 4, 2005

(65) Prior Publication Data
US 2007/0101520 A1    May 10, 2007

(51) Int. Cl.
E01D 1/00     (2006.01)
E01D 12/00    (2006.01)
E01D 15/10    (2006.01)

(52) U.S. Cl. .................... 14/71.5; 14/71.3; 14/77.1; 14/72.5

(58) Field of Classification Search ............ 14/71.5, 14/71.3, 77.1, 72.5
See application file for complete search history.

(56) References Cited

U.S. PATENT DOCUMENTS

| | | | | | |
|---|---|---|---|---|---|
| 3,060,471 | A | * | 10/1962 | Der Yuen et al. | 14/71.5 |
| 3,808,626 | A | * | 5/1974 | Magill | 14/71.5 |
| 3,843,987 | A | * | 10/1974 | Lodjic | 14/71.5 |
| 4,333,195 | A | * | 6/1982 | Lichti | 14/71.5 |
| 4,715,077 | A | * | 12/1987 | Shepheard | 14/71.5 |
| 6,212,724 | B1 | * | 4/2001 | Zhou | 14/71.5 |
| 6,330,726 | B1 | * | 12/2001 | Hone et al. | 14/71.5 |
| 6,704,963 | B1 | * | 3/2004 | Hutton | 14/71.5 |
| 6,724,314 | B2 | * | 4/2004 | Hutton | 340/686.1 |
| 6,725,488 | B2 | * | 4/2004 | Hinkle | 14/71.5 |
| 6,757,927 | B2 | * | 7/2004 | Hutton et al. | 14/71.5 |
| 6,772,464 | B2 | * | 8/2004 | Hutton | 14/71.5 |
| 6,928,684 | B2 | * | 8/2005 | Ratliff et al. | 14/71.5 |
| 6,954,959 | B2 | | 10/2005 | Hutton | |
| 7,030,354 | B2 | * | 4/2006 | Oki et al. | 250/206.2 |
| 2003/0145400 | A1 | * | 8/2003 | Hinkle | 14/71.5 |
| 2003/0145404 | A1 | * | 8/2003 | Hutton | 14/71.5 |
| 2004/0019984 | A1 | * | 2/2004 | Hutton | 14/71.5 |
| 2004/0083563 | A1 | * | 5/2004 | Hutton et al. | 14/71.3 |
| 2004/0172776 | A1 | * | 9/2004 | Hutton | 14/71.5 |
| 2004/0172777 | A1 | * | 9/2004 | Hutton | 14/71.7 |
| 2004/0187234 | A1 | * | 9/2004 | Hutton et al. | 14/71.5 |
| 2005/0198750 | A1 | * | 9/2005 | Spencer et al. | 14/71.5 |
| 2007/0084001 | A1 | * | 4/2007 | Anderberg | 14/71.5 |
| 2007/0136961 | A1 | * | 6/2007 | Shen et al. | 14/71.3 |

OTHER PUBLICATIONS

Hutton, Declaration Under 37 C.F.R. 1.132 dated Jan. 26, 2006.

* cited by examiner

Primary Examiner—Thomas B Will
Assistant Examiner—Alina Schiller
(74) Attorney, Agent, or Firm—Freedman & Associates

(57) ABSTRACT

Passenger boarding bridges have adjustable walkways that are elevated high above the ground when servicing aircraft doorways. Passenger safety is improved by automatically stabilizing the passenger boarding bridge when it is in an aligned condition. A method for automatically stabilizing the passenger boarding bridge includes moving the aircraft-engaging end of the passenger boarding bridge into an aligned relationship relative to the doorway of an aircraft. The aligned relationship between the aircraft-engaging end of the passenger boarding bridge and the doorway of the aircraft is detected automatically. Adjustable jacks, which are fixedly mounted to the passenger boarding bridge wheel carriage, are actuated between a retracted condition and an extended condition. In the extended condition, the adjustable jacks engage a ground surface below the passenger boarding bridge, thereby increasing the stability of the passenger boarding bridge.

20 Claims, 5 Drawing Sheets

US 7,428,765 B2

PASSENGER BOARDING BRIDGE STABILIZING APPARATUS AND METHOD THEREFOR

FIELD OF THE INVENTION

The instant invention relates generally to aircraft passenger boarding bridges, and more particularly to a method and apparatus for stabilizing a passenger boarding bridge.

BACKGROUND

In order to make aircraft passengers comfortable, and in order to transport them between an airport terminal building and an aircraft in such a way that they are protected from weather and other environmental influences, passenger boarding bridges are used which can be telescopically extended and the height of which is adjustable. For instance, an apron drive bridge in present day use includes a plurality of adjustable modules, including: a rotunda, a telescopic tunnel, a bubble section, a cab, and elevating columns with wheel carriage. Other common types of passenger boarding bridges include radial drive bridges and over-the-wing (OTW) bridges. These types of passenger boarding bridges are adjustable, for instance to compensate for different sized aircraft and to compensate for imprecise parking of aircraft at an airport terminal.

Nowadays, passenger boarding bridges are used increasingly to service aircraft doorways that pose particular challenges, which raises new concerns regarding passenger safety, the risk of causing damage to the aircraft and the effects of bridge failure. The design of very large aircraft, such as for instance the Airbus A380, requires elevation of the aircraft-engaging end of the passenger boarding bridge to a height of about 26.6 feet above the apron in order to service an upper deck doorway of the aircraft. At this height above the ground, passenger safety is compromised under conditions that render the passenger boarding bridge unstable, such as for instance windy conditions. Furthermore, the U1 doorway is located elevationally above the A380 left wing, thereby requiring the passenger boarding bridge to be extended over the wing of the aircraft during the alignment operation. Clearly, passenger boarding bridge stability is of great importance.

One solution is to incorporate stabilizing jacks adjacent the ends of the wheel carriage and outside of the drive wheels. When deployed, the jacks provide a wider support base compared to a standard wheel carriage, and assist in stabilizing the tunnel section high above the ground and/or over the wing of the aircraft. Unfortunately, a human bridge operator is prone to forgetting to deploy the stabilizing jacks, or may even deliberately choose not to deploy the stabilizing jacks under conditions that are judged to be safe. For instance, calm wind conditions may prompt a human operator to forego deploying the stabilizing jacks so as to save time if the passenger boarding bridge requires additional minor adjustments, or if the turn-around time of the aircraft is very short. Unfortunately, conditions may change rapidly or the human operator may misjudge operating conditions, thereby subjecting unnecessarily the passengers and the aircraft to risk.

It would be advantageous to provide a system and method that overcomes at least some of the above-mentioned limitations.

SUMMARY OF EMBODIMENTS OF THE INVENTION

It is an object of at least one embodiment of the instant invention to provide a method and system for automatically deploying stabilizing jacks of a passenger boarding bridge.

In accordance with an aspect of the instant invention there is provided a method for stabilizing a passenger boarding bridge, comprising: providing a passenger boarding bridge including a tunnel section having an aircraft-engaging end supported in a height adjustable manner by a wheel carriage including drive wheels and a plurality of adjustable jacks; moving the aircraft-engaging end of the passenger boarding bridge into an aligned relationship relative to a doorway of an aircraft; detecting automatically the aligned relationship between the aircraft-engaging end of the passenger boarding bridge and the doorway of the aircraft; and, actuating automatically each jack of the plurality of adjustable jacks between a retracted condition and an extended condition.

In accordance with another aspect of the instant invention there is provided a method for stabilizing a passenger boarding bridge, comprising: providing a passenger boarding bridge including a tunnel section having an aircraft-engaging end supported in a height adjustable manner by a wheel carriage including drive wheels and a plurality of adjustable jacks; performing a movement of the aircraft-engaging end of the passenger boarding bridge along an alignment direction relative to a doorway of an aircraft; determining automatically an alignment status of the aircraft-engaging end of the passenger boarding bridge resulting from the movement; and, actuating automatically each jack of the plurality of adjustable jacks between a retracted condition and an extended condition, the extended condition selected from a plurality of different predetermined extended conditions and in dependence upon the determined alignment status.

In accordance with another aspect of the instant invention there is provided an apparatus for stabilizing a passenger boarding bridge, the passenger boarding bridge including a tunnel section having an aircraft-engaging end and supported in a height adjustable manner by a wheel carriage including drive wheels, the apparatus comprising: a first adjustable jack and a second adjustable jack fixedly mounted one each adjacent opposite ends of the wheel carriage such that the drive wheels are disposed therebetween; and, an automated controller in communication with each one of the first adjustable jack and the second adjustable jack, the automated controller for detecting the aligned relationship between the aircraft-engaging end of the passenger boarding bridge and the doorway of the aircraft and for actuating automatically each one of the first adjustable jack and the second adjustable jack between a retracted condition and an extended condition when the aligned condition is detected.

BRIEF DESCRIPTION OF THE DRAWINGS

Exemplary embodiments of the invention will now be described in conjunction with the following drawings, in which similar reference numerals designate similar items.

DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

Figure 1:
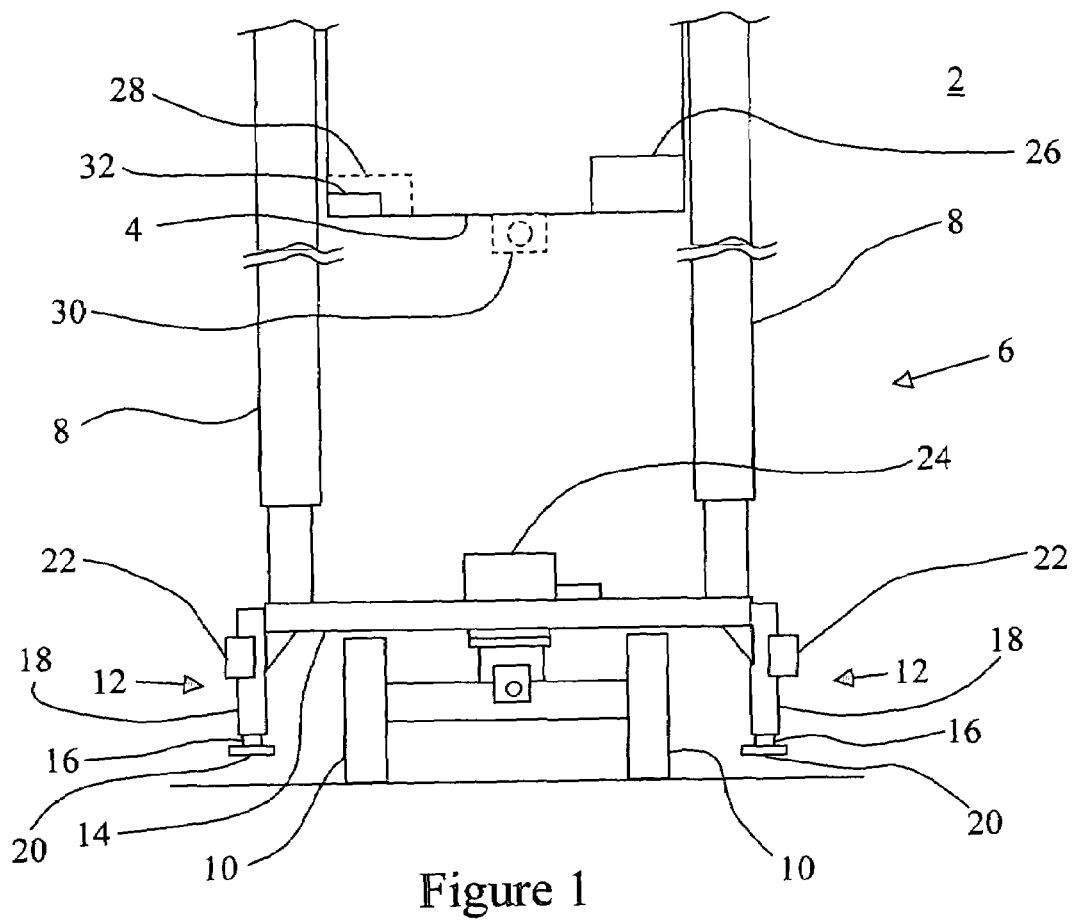
FIG. 1 is a front view of an aircraft passenger boarding bridge wheel carriage.

Referring to FIG. 1, shown is a simplified end view of a passenger boarding bridge 2. The passenger boarding bridge 2 includes a tunnel section 4 that is supported near an outboard end thereof by a main elevating mechanism in the form of a wheel carriage 6 including height adjustable support posts 8 and drive wheels 10. The drive wheels 10 are for achieving angular displacement of the tunnel section 4 along the apron surface. When the tunnel section 4 is telescopically extensible, then the drive wheels 10 are also used for extending the length of the tunnel section 4. The drive wheels 10 are mounted one each at opposite ends of an axel assembly 50. The axel assembly 50 is pivotally mounted to a steering assembly 52 via a coupling 54. For instance, the coupling is one of a bolt and a pin. Accordingly, wind load or other twisting stresses on the tunnel section 4 are translated into pivoting motion about the coupling 54. Such twisting of the tunnel section 4 is translated back to a not illustrated rotunda, which supports the inboard end of the tunnel section 4 via two mounting pins. The two mounting pins at the inboard end, together with the coupling 54, form a three-point system for supporting the tunnel section 4.

For improved stability, a plurality of jacks 12 is mounted to cross beam 14 of wheel carriage 6, each one of the plurality of jacks includes an inner suspension tube assembly 16 that is telescopically received within an outer suspension tube assembly 18. By way of non-limiting example, the outer suspension tube assembly 18 is fixedly mounted to the cross beam 14 by known means, such as for instance one of bolting and welding. A ground-engaging member 20 is mounted at a free end of the inner suspension tube assembly 16. Each jack includes a mechanism 22 in communication with a power source 24 for extending the inner suspension tube assembly 16 relative to the outer suspension tube assembly 18. For instance, some non-limiting examples of a suitable mechanism include a ball-screw jack mechanism including an electric motor, and a hydraulic mechanism including a pump. Some non-limiting examples of a suitable power source include an airport terminal line voltage source, a gasoline or diesel powered portable generator, a portable fuel cell, and a storage battery. The mechanism 22 and power source 24 cooperate to extend the inner suspension tube assembly 16 to a length that is sufficient to stabilize the wheel carriage 6. In the instant example, the two jacks 12 form a four-point support system together with the two mounting pins at the inboard end, when the two jacks 12 are in a ground engaging condition. Accordingly, the coupling 54 is not used to support the tunnel section 4 when the two jacks 12 are in the ground engaging condition.

Also shown in FIG. 1 is an operator control panel 26 disposed within tunnel section 4 for supporting manual operation of the passenger boarding bridge 2. The operator control panel 26 includes controls for adjusting the length, height, and angular orientation of the tunnel section 4 of passenger boarding bridge 2. Preferably, the operator control panel 26 is disposed proximate an aircraft-engaging end of the passenger boarding bridge 2, such that a human operator may observe directly the alignment toward an aircraft doorway.

Optionally, an automated bridge alignment control system including a bridge controller 28 is provided for operating the passenger boarding bridge 2 in an automated manner. An optional imager 30 is provided proximate the aircraft-engaging end of passenger boarding bridge 2, and in communication with bridge controller 28 for providing image data thereto. An example of an automated bridge alignment control system suitable for use with the passenger boarding bridge of FIG. 1 is disclosed in U.S. Pat. No. 6,724,314, issued to Hutton on Apr. 20, 2004, the entire contents of which is incorporated herein by reference. Manual over-ride of the bridge controller 28 is achieved using the operator control panel 26.

Referring still to FIG. 1, a controller 32 is provided in communication with at least one of the mechanism 22 and the power source 24, for controllably extending and retracting the jacks 12. Optionally, the controller 32 is a stand-alone controller of a bridge stabilization system including the jacks 12. Optionally, the controller 32 is integrated with in the bridge controller 28 of the automated bridge alignment control system. The controller 32 is also in communication with the operator control panel 26, and in communication with optional sensors (not illustrated) that are disposed proximate the aircraft-engaging end of passenger boarding bridge 2. Non-limiting examples of sensor types, when present, include contact sensors, pressure sensors, non-contact sensors, inductive sensors, electromagnetic sensors and acoustic sensors.

Optionally, the controller 32 is a mechanical controller including a sensor disposed proximate the aircraft-engaging end of passenger boarding bridge 2. Non-limiting examples of sensor types include contact sensors, pressure sensors, non-contact sensors, inductive sensors, electromagnetic sensors and acoustic sensors.

Figure 2:
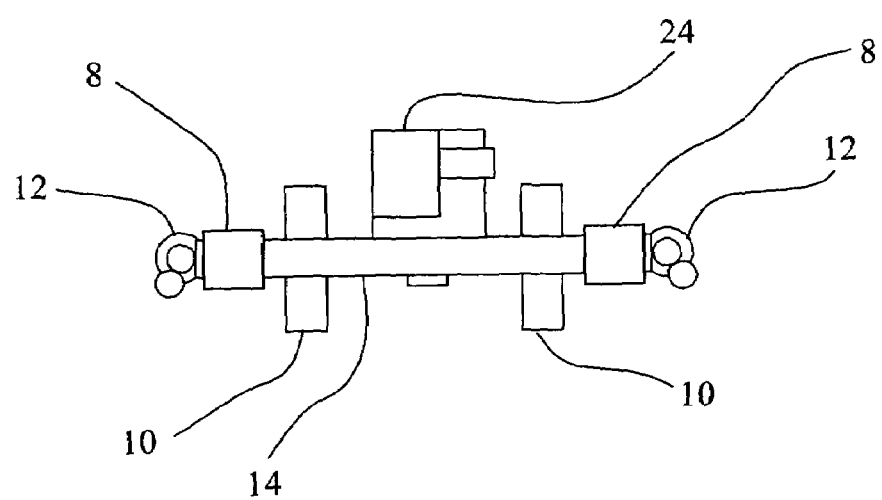
FIG. 2 is a top view of the wheel carriage of FIG. 1.

Referring now to FIG. 2, shown is a simplified top view of the passenger boarding bridge 2. Elements labeled with the same numerals have the same function as those illustrated in FIG. 1. The tunnel section 4 has been omitted for improved clarity and to facilitate discussion of the figure. As shown in FIG. 2, the plurality of jacks includes two side-mounted stabilizer jacks 12, disposed one each adjacent opposite ends of cross beam 14 and outside the drive wheels 10. Such an arrangement provides a wide support base, and is therefore stable. Optionally, the two jacks 12 are arranged differently relative to the cross beam 14. For instance, at least some of the jacks 12 optionally are disposed along the cross beam 14 at a point that is between the drive wheels 10. Further optionally, a number of jacks 12 other than two is provided.

Figure 3A:
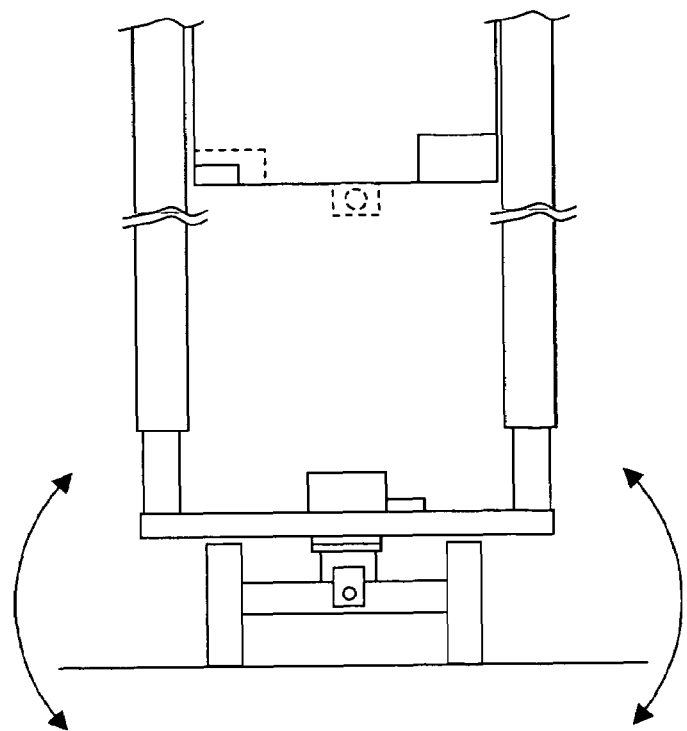
FIG. 3a is a simplified end view of a passenger boarding bridge without stabilizing jacks, showing relative twisting motion due to wind load or other stresses.

Referring now to FIG. 3a, shown is a simplified end view of a passenger boarding bridge without stabilizing jacks 12. The length of the double-headed arrows in the figure is representative of the twisting motion induced by wind or other stresses about the coupling 54.

Figure 3B:
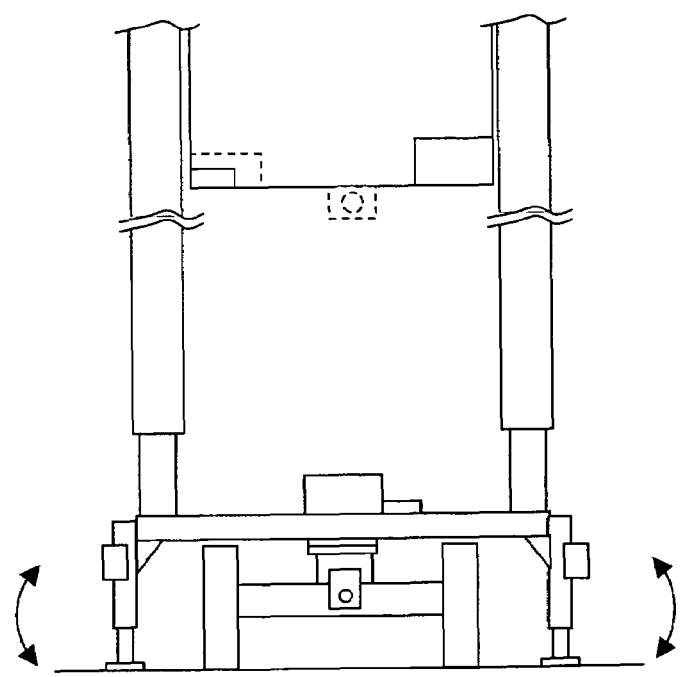
FIG. 3b is a simplified end view of a passenger boarding bridge with stabilizing jacks, showing relative twisting motion due to wind load or other stresses.

Referring now to FIG. 3b, shown is a simplified end view of a passenger boarding bridge with stabilizing jacks 12 in a ground engaging condition. The double-headed arrows in FIG. 3b are shorter than the double-headed arrows in FIG. 3a, which is illustrative of the relatively smaller twisting motion that is induced by same wind or other stresses about the coupling 54 when the stabilizing jacks 12 are in the ground engaging condition.

Figure 4:
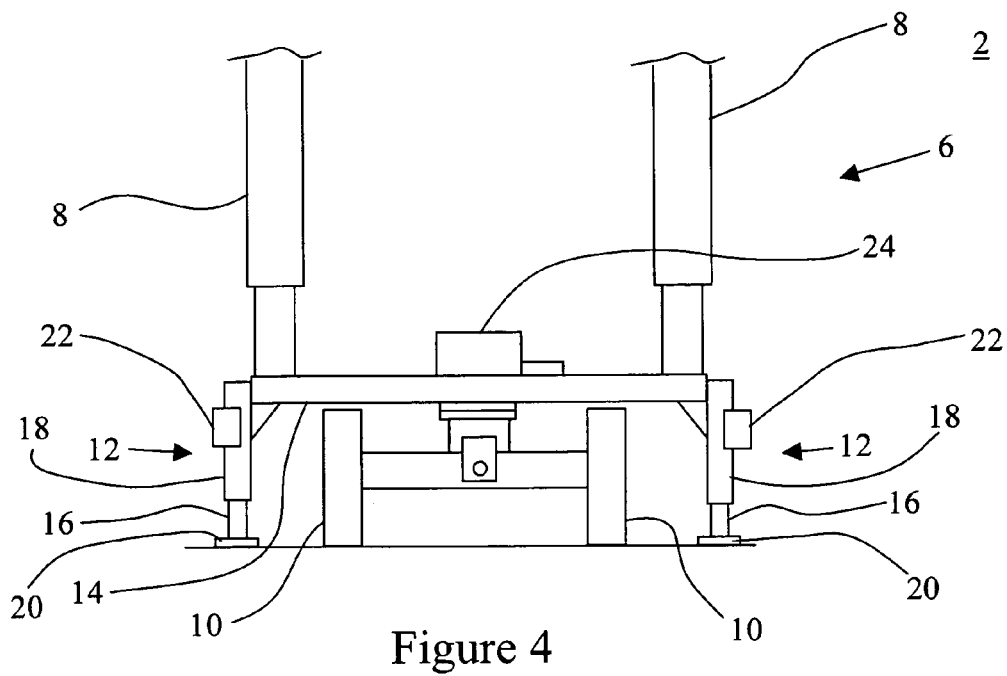
FIG. 4 is a partial front view of the wheel carriage of FIG. 1, showing a plurality of adjustable jacks in a first extended condition.

Referring now to FIG. 4, shown is a simplified end view of the passenger boarding bridge 2 with the plurality of jacks 12 deployed in a first stabilizing condition. Elements labeled with the same numerals have the same function as those illustrated in FIG. 1. When in the first stabilizing condition, each jack 12 is extended such that the ground-engaging member 20 just makes contact with a ground surface. Extension of the jacks 12 is performed under the control of controller 32. As shown in FIG. 4, the drive wheels 10 maintain contact with the ground surface when the jacks 12 are in the first stabilizing condition. The jacks 12, when they are deployed in this manner, increase the support-base width of the wheel carriage 6. The jacks 12 do not lift the drive wheels 10 off the ground surface when in the first stabilizing condition, and so optionally the wheel carriage 6 is of heavy duty construction, for instance using over-sized cross beams 14 and/or over-sized height adjustable support posts 8. Within this context, over-sized means having dimensions that are larger than typical and/or being constructed of heavier weight materials than is typical in passenger boarding bridge construction. The combination of a wide support-base between jacks 12, the use of heavy weight materials in the components that are situated close to the drive wheels 10, and the use of sturdy height-adjustable support posts 8 results in greater stability of the tunnel section 4, even when it is elevated to maximum height under windy or other adverse conditions.

Figure 5:
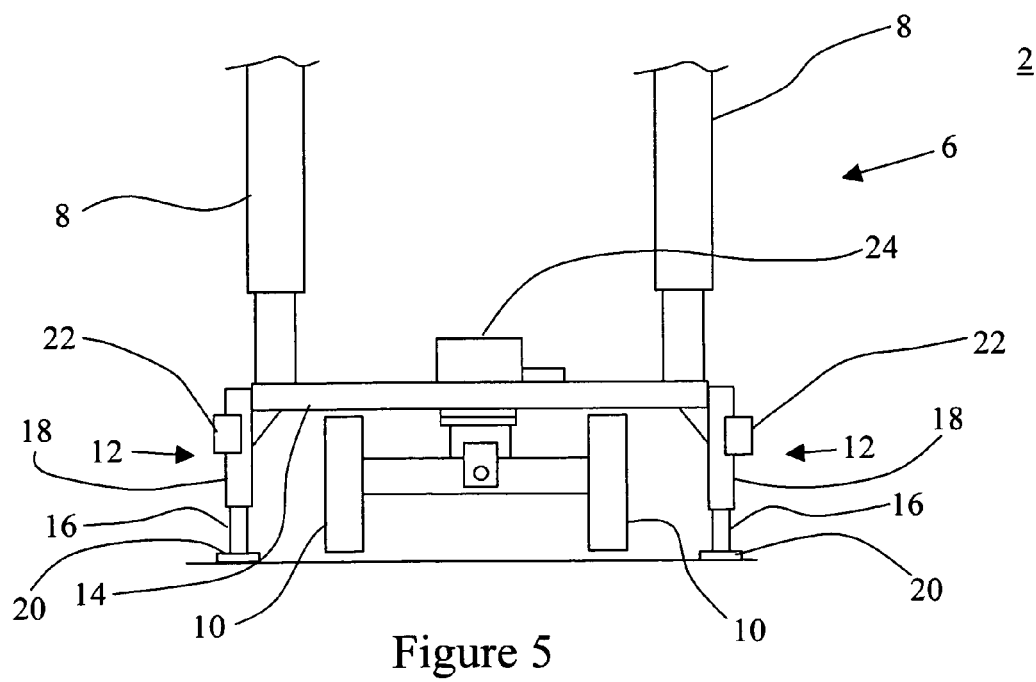
FIG. 5 is a partial front view of the wheel carriage of FIG. 1, showing a plurality of adjustable jacks in a second extended condition.

Referring now to FIG. 5, shown is a simplified end view of the passenger boarding bridge 2 with the plurality of jacks 12 deployed in a second stabilizing condition. Elements labeled with the same numerals have the same function as those illustrated in FIG. 1. When in the second stabilizing condition, each jack 12 is extended such that the ground-engaging member 20 makes contact with a ground surface and effects an upward motion of the wheel carriage 6. Extension of the jacks 12 is performed under the control of controller 32. As shown in FIG. 5, the drive wheels 10 are lifted out of contact with the ground surface when the jacks 12 are in the second stabilizing condition. The jacks 12, when they are deployed in this manner, increase the support-base width of the wheel carriage 6. Provided the jacks 12 are sufficiently powerful, optionally the wheel carriage 6 is of heavy duty construction, for instance using over-sized cross beams 14 and/or over-sized height adjustable support posts 8. Within this context, over-sized means having dimensions that are larger than typical and/or being constructed of heavier weight materials than is typical in passenger boarding bridge construction. The combination of a wide support-base between jacks 12, the use of heavy weight materials in the components that are situated close to the drive wheels 10, and the use of sturdy height-adjustable support posts 8 results in greater stability of the tunnel section 4, even when it is elevated to maximum height under windy or other adverse conditions.

Figure 6:
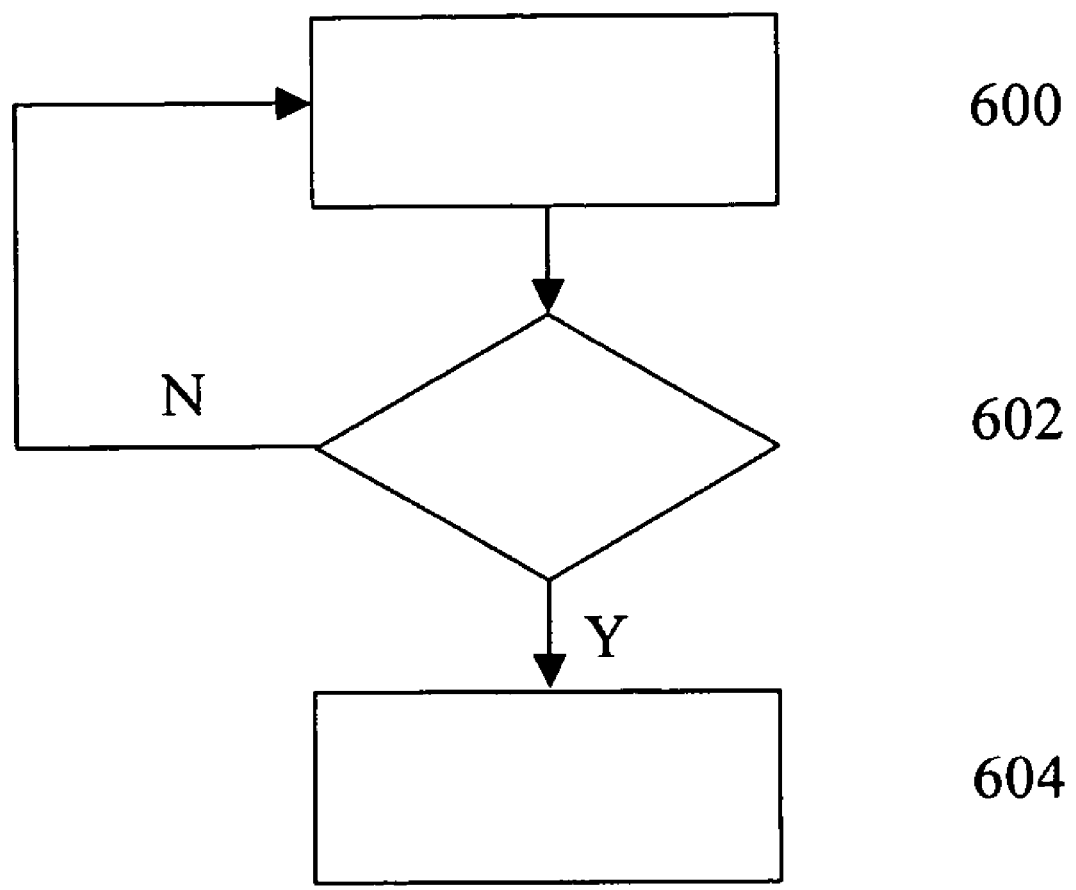
FIG. 6 is a simplified flow diagram of a method according to an embodiment of the instant invention; and, FIG. 7 is a simplified flow diagram of another method according to an embodiment of the instant invention.

Referring now to FIG. 6, shown is a simplified flow diagram of a method according to an embodiment of the instant invention. At step 600, an aircraft-engaging end of a passenger boarding bridge is moved along an alignment direction relative to a doorway of an aircraft. For instance, the length of the passenger boarding bridge tunnel section 4 is changed, and/or the tunnel section 4 is driven angularly in a horizontal plane, and/or the tunnel section 4 is driven angularly in a vertical plane. Adjustments to the length and angular adjustments in the horizontal plane are achieved by actuating the drive wheels 10 of wheel carriage 6, and by turning the drive wheels 10 so as to steer the aircraft-engaging end of the passenger boarding bridge along the apron surface in the alignment direction. Angular adjustments in the vertical plane are achieved by actuating the height-adjustable support posts 8. Step 600 optionally is performed in a manual fashion using the operator control panel 26, or in an automated fashion using an automated bridge alignment control system.

At step 602, a determination is made whether the aircraft-engaging end of the passenger boarding bridge is in an aligned relationship relative to the aircraft doorway. In particular, controller 32 makes the determination in an automated manner. For instance, sensors are arranged along the aircraft-engaging end of the passenger boarding bridge for sensing contact with, or close approach to, the aircraft fuselage. The sensors provide to the controller 32 a signal when in contact with the aircraft fuselage, or upon sensing a predetermined distance to the aircraft fuselage. The signal being received at the controller 32 is indicative that the aircraft-engaging end of the passenger boarding bridge is in the aligned relationship relative to the aircraft doorway, and the determination is made upon this basis. Alternatively, the controller 32 monitors all movements of the passenger boarding bridge, for instance by using motion sensors, or by monitoring various transducers disposed along the passenger boarding bridge 2. Upon expiration of a predetermined time period since a last bridge movement, the controller 32 makes the determination that the aircraft-engaging end of the passenger boarding bridge is in the aligned relationship relative to the aircraft doorway. Alternatively, when a human operator performs the alignment operation in a manual fashion, the controller 32 detects the manual controls being powered down or disabled at the end of the alignment operation, and makes the determination that the aircraft-engaging end of the passenger boarding bridge is in the aligned relationship relative to the aircraft doorway. Alternatively, when the automated bridge control system performs the alignment operation in an automated fashion, the bridge controller 28 provides to the controller 32 a signal that is indicative of the aircraft-engaging end of the passenger boarding bridge being in the aligned relationship relative to the aircraft doorway. When the signal is received at the controller 32, it is determined that the aircraft-engaging end of the passenger boarding bridge is in the aligned relationship relative to the aircraft doorway. Optionally, the controller 32 is integrated with bridge controller 28, in which case the determination simply is made subsequent to performing a known last step of the bridge alignment operation. In each case, when the controller 32 makes the determination to within a predetermined threshold value, an aligned relationship is detected.

Of course, if it is determined at step 602 that the aircraft-engaging end of the passenger boarding bridge is not in an aligned relationship relative to the aircraft doorway, then the alignment operation continues at step 600.

At step 604, in dependence upon determining that the aircraft-engaging end of the passenger boarding bridge is in an aligned relationship relative to the aircraft doorway, the jacks 12 are deployed automatically. For instance, the jacks are extended under the control of controller 32 into one of the first stabilizing condition and the second stabilizing condition.

When the jacks are extended into the second stabilizing condition, the drive wheels 10 are displaced elevationally upwards by a predetermined distance d. Optionally, the aligned relationship is defined such that a floor portion of the tunnel section 4 is disposed the distance d below the sill of the aircraft doorway. Accordingly, the final adjustment to bring the floor portion into a co-planar arrangement with the sill of the aircraft doorway is performed when the jacks 12 are extended into the second stabilizing condition. Optionally, the floor portion is in a co-planar arrangement with the sill of the aircraft doorway at the end of the alignment operation, and the controller 32 automatically retracts the height-adjustable support posts by an amount that is sufficient to compensate for the upward displacement of the drive wheels 10 by the amount d.

Figure 7:
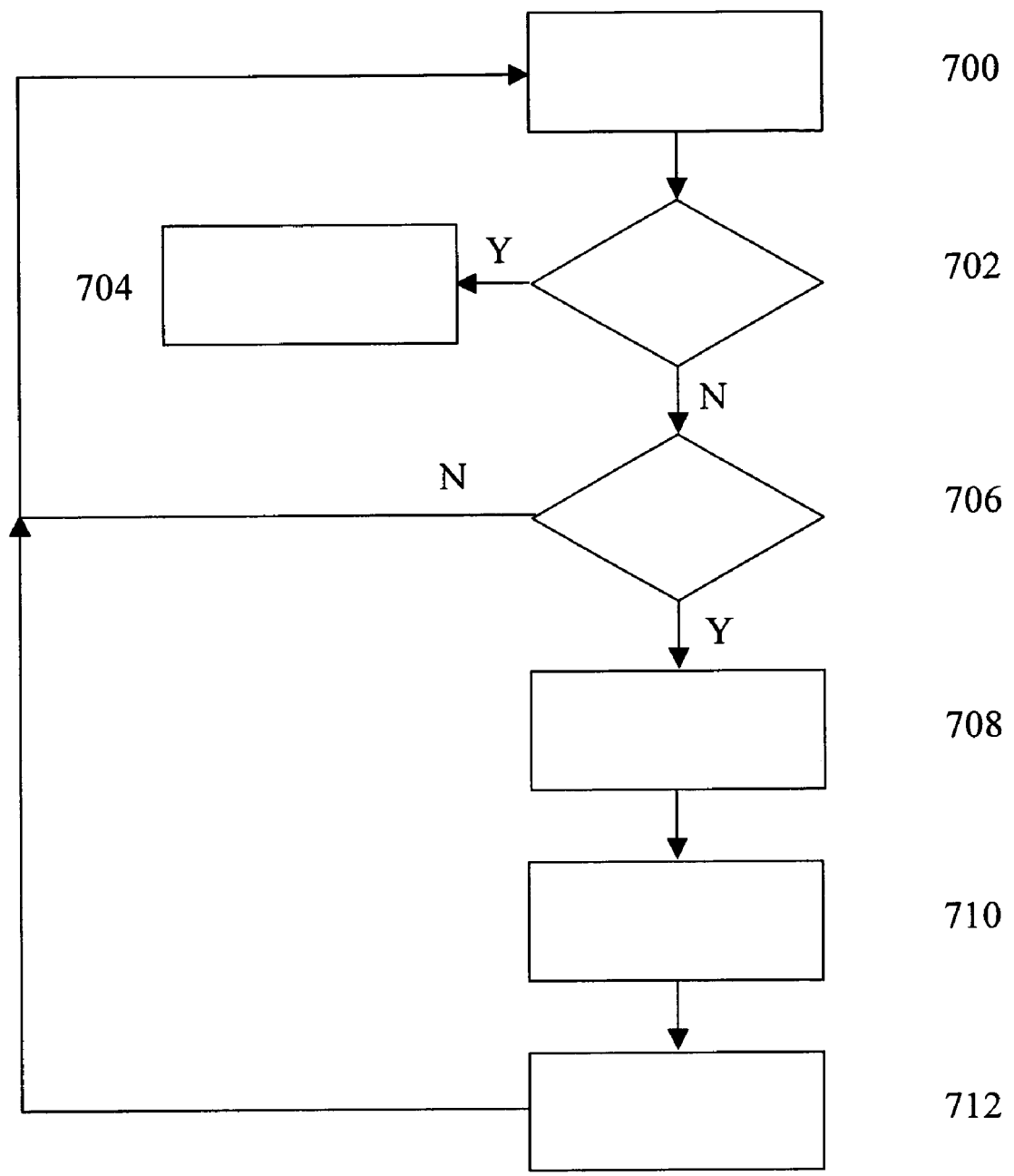

Referring now to FIG. 7, shown is a simplified flow diagram of another method according to an embodiment of the instant invention. At step 700, a movement of the aircraft-engaging end of the passenger boarding bridge is performed along an alignment direction relative to a doorway of an aircraft. For instance, the length of the passenger boarding bridge tunnel section 4 is changed, and/or the tunnel section 4 is driven angularly in a horizontal plane, and/or the tunnel section 4 is driven angularly in a vertical plane. Adjustments to the length and angular adjustments in the horizontal plane are achieved by actuating the drive wheels 10 of wheel carriage 6, and by turning the drive wheels 10 so as to steer the aircraft-engaging end of the passenger boarding bridge along the apron surface in the alignment direction. Angular adjustments in the vertical plane are achieved by actuating the height-adjustable support posts 8. Step 700 optionally is performed in a manual fashion using the operator control panel 26, or in an automated fashion using an automated bridge alignment control system.

At step 702, an alignment status of the aircraft-engaging end of the passenger boarding bridge resulting from the movement is determined automatically. For instance, a determination is made whether or not the aircraft-engaging end of the passenger boarding bridge is in an aligned relationship relative to the aircraft doorway. If it is determined at step 702 that the aircraft-engaging end of the passenger boarding bridge is in the aligned relationship, then at step 704 the jacks 12 are deployed automatically under the control of controller 32 into the second stabilizing condition. When in the second stabilizing condition, each jack 12 is extended such that the ground-engaging member 20 makes contact with a ground surface and effects an upward motion of the wheel carriage 6. The jacks 12 provide a wide support-base for supporting the tunnel section 4. In addition, the jacks 12 are fixedly mounted to the cross beam 14 of wheel carriage 6, which eliminates the pivoting motion about the coupling 54. This results in reduced sideways, or twisting, movement of the tunnel section 4, even when elevated high above the ground under windy or other adverse conditions. The jacks 12 remain deployed as long as the passenger boarding bridge is in the aligned relationship relative to the aircraft doorway. Preferably, the jacks 12 are retracted automatically immediately prior to a movement of the passenger boarding bridge away from the aircraft.

Controller 32 makes the determination at step 702 in an automated manner. For instance, sensors are arranged along the aircraft-engaging end of the passenger boarding bridge for sensing contact with, or close approach to, the aircraft fuselage. The sensors provide to the controller 32 a signal when in contact with the aircraft fuselage, or upon sensing a predetermined distance to the aircraft fuselage. The signal being received at the controller 32 is indicative that the aircraft-engaging end of the passenger boarding bridge is in the aligned relationship relative to the aircraft doorway, and the determination is made upon this basis. Alternatively, when a human operator performs the alignment operation in a manual fashion, the controller 32 detects the manual controls being powered down or disabled at the end of the alignment operation, and makes the determination that the aircraft-engaging end of the passenger boarding bridge is in the aligned relationship relative to the aircraft doorway. Alternatively, when the automated bridge control system performs the alignment operation in an automated fashion, the bridge controller 28 provides to the controller 32 a signal that is indicative of the aircraft-engaging end of the passenger boarding bridge being in the aligned relationship relative to the aircraft doorway. When the signal is received at the controller 32, it is determined that the aircraft-engaging end of the passenger boarding bridge is in the aligned relationship relative to the aircraft doorway. Optionally, the controller 32 is integrated with bridge controller 28, in which case the determination simply is made subsequent to performing a known last step of the bridge alignment operation.

When the jacks are extended into the second stabilizing condition, the drive wheels 10 are displaced elevationally upwards by a predetermined distance d. Optionally, the aligned relationship is defined such that a floor portion of the tunnel section 4 is disposed the distance d below the sill of the aircraft doorway. Accordingly, the final adjustment to bring the floor portion into a co-planar arrangement with the sill of the aircraft doorway is performed when the jacks 12 are extended into the second stabilizing condition. Optionally, the floor portion is in a co-planar arrangement with the sill of the aircraft doorway at the end of the alignment operation, and the controller 32 automatically retracts the height-adjustable support posts by an amount that is sufficient to compensate for the upward displacement of the drive wheels 10 by the amount d.

However, if it is determined at step 702 that the aircraft-engaging end of the passenger boarding bridge is not in the aligned relationship then it is further determined at step 706 whether a predetermined time interval has elapsed since a last movement of the passenger boarding bridge. If the predetermined time interval has elapsed since a last movement of the passenger boarding bridge, then the automated alignment operation is considered to be paused temporarily, and at step 708 the jacks 12 are deployed automatically under the control of controller 32 into the first stabilizing condition. Step 710 is a step of waiting for a next movement of the passenger boarding bridge. For instance, at step 710 the controller 32 waits for a signal that is indicative of a command for moving the aircraft-engaging end of the passenger boarding bridge. At step 712, the jacks 12 are retracted automatically under the control of the controller 32, and the aircraft-engaging end of the passenger boarding bridge is moved once again along the alignment direction at step 700. A non-limiting example is pre-positioning the passenger boarding bridge to an intermediate position prior to the aircraft coming to a full stop. For instance, the passenger boarding bridge is moved from a stowed position to a pre-position that is appropriate for a known type of the aircraft. Once moved to the pre-position, no further movement of the passenger boarding bridge occurs until the aircraft has come to a full stop. After a predetermined period of time since the passenger boarding bridge stops at the pre-position, the jacks 12 are deployed automatically into the first stabilizing condition, such that the passenger boarding bridge is stabilized without the drive wheels 10 being lifted out of contact with the ground surface. This provides stabilization while the aircraft continues to advance toward the passenger boarding bridge, but does not use power unnecessarily to lift the weight of the passenger boarding bridge. Furthermore, the jacks 12 are deployed quickly into, and retracted quickly from, the first stabilizing condition, such that the time required to perform the overall alignment operation is not increased.

Numerous other embodiments may be envisaged without departing from the spirit and scope of the invention.

What is claimed is:

1. A method for stabilizing a passenger boarding bridge, comprising:
   providing a passenger boarding bridge including a tunnel section having an aircraft-engaging end supported in a height adjustable manner by a wheel carriage including drive wheels and a plurality of adjustable jacks;
   moving the aircraft-engaging end of the passenger boarding bridge into an aligned relationship relative to a doorway of an aircraft;
   detecting automatically the aligned relationship between the aircraft-engaging end of the passenger boarding bridge and the doorway of the aircraft; and,
   in dependence upon detecting the aligned relationship between the aircraft-engaging end of the passenger boarding bridge and the doorway of the aircraft, actuating automatically each jack of the plurality of adjustable jacks between a retracted condition and an extended condition,
   wherein detecting automatically the aligned relationship between the aircraft-engaging end of the passenger boarding bridge and the doorway of the aircraft comprises making a determination, to within a range of predetermined threshold values, that the aircraft-engaging end of the passenger boarding bridge and the doorway of the aircraft are in the aligned relationship, and,
   wherein the determination is made in dependence upon the expiration of a predetermined period of time since a last movement of the passenger boarding bridge.

2. A method according to claim 1, wherein the plurality of adjustable jacks, when in the extended condition, co-operate to provide a support-base for the passenger boarding bridge that is wider than a support-base provided by the drive wheels.

3. A method according to claim 1, wherein actuating automatically each jack of the plurality of adjustable jacks between the retracted condition and the extended condition translates into elevating the drive wheels out of a ground-engaging condition.

4. A method according to claim 1, wherein the aligned relationship relates to alignment, along a direction of travel of the drive wheels, of the aircraft-engaging end of the passenger boarding bridge relative to the doorway of the aircraft.

5. A method according to claim 4, wherein the aligned relationship further relates to a height of the aircraft-engaging end of the passenger boarding bridge relative to a sill-height of the doorway of the aircraft.

6. A method for stabilizing a passenger boarding bridge, comprising:
   providing a passenger boarding board including a tunnel section having an aircraft-engaging end supported in a height adjustable manner by a wheel carriage including drive wheels and a plurality of adjustable jacks;
   moving the aircraft-engaging end of the passenger boarding bridge into an aligned relationship relative to a doorway of an aircraft;
   detecting automatically the aligned relationship between the aircraft-engaging end of the passenger boarding bridge and the doorway of the aircraft; and
   in dependence upon detecting the aligned relationship between the aircraft-engaging end of the passenger boarding bridge and the doorway of the aircraft, actuating automatically each jack of the plurality of adjustable jacks between a retracted condition and an extended condition,
   wherein detecting automatically the aligned relationship between the aircraft-engaging end of the passenger boarding bridge and the doorway of the aircraft comprises making a determination, to within a range of predetermined threshold values, that the aircraft-engaging end of the passenger boarding bridge and the doorway of the aircraft are in the aligned relationship, and,
   wherein the determination is made in dependence upon an operator control panel being one of powered down and disabled.

7. A method according to claim 1, wherein detecting automatically the aligned relationship between the aircraft-engaging end of the passenger boarding bridge and the doorway of the aircraft comprises receiving a signal from a sensor disposed proximate the aircraft-engaging end of the passenger boarding bridge, the signal indicative of one of a close approach to and contact with an outer surface of the aircraft.

8. A method for stabilizing a passenger boarding bridge, comprising:
   providing a passenger boarding bridge including a tunnel section having an aircraft-engaging end supported in a height adjustable manner by a wheel carriage including drive wheels and a plurality of adjustable jacks, each jack of the plurality of adjustable jacks being extendable between a retracted condition and an extended condition selected from a plurality of different predetermined extended conditions;
   performing a movement of the aircraft-engaging end of the passenger boarding bridge along an alignment direction relative to a doorway of an aircraft;
   determining automatically an alignment status of the aircraft-engaging end of the passenger boarding bridge resulting from the movement;
   determining time elapsed since performing the movement;
   comparing the determined time elapsed to threshold values: and
   when the determined time elapsed is within a predetermined range of threshold values, selecting a predetermined extended condition from the plurality of different predetermined conditions for extending each jack of the plurality of adjustable jacks such that the drive wheels maintain contact with a around surface that is disposed elevationally below the passenger boarding bridge; and
   actuating automatically each jack of the plurality of adjustable jacks between the retracted condition and the selected predetermined extended condition,
   wherein the determined alignment status is indicative of the aircraft-engaging end of the passenger boarding bridge being not-aligned with the doorway.

9. A method according to claim 8, wherein the plurality of adjustable jacks, when in any one of the plurality of different predetermined extended conditions, co-operate to provide a support-base for the passenger boarding bridge that is wider than a support-base provided by the drive wheels.

10. A method according to claim 8, wherein determining automatically an alignment status comprises receiving a signal from a sensor disposed proximate the aircraft-engaging end of the passenger boarding bridge, the signal being indicative of other than close approach to or contact with an outer surface of the aircraft.

11. A method according to claim 8, wherein determining automatically an alignment status comprises receiving a signal from an automated bridge controller, the signal indicative of the aligned relationship.

12. A method for stabilizing a passenger boarding bridge comprising:
provuding a passenger boarding bridge including a tunnel section having an aircraft-engaging end supported in a height adjustable manner by a wheel carriage including drive wheels and a plurality of adjustable jacks;
performing a movement of the aircraft-engaging end of the passenger boarding bridge along an alignment direction relative to a doorway of an aircraft;
determining automatically an alignment status of the aircraft-engaging end of the passenger boarding bridge resulting from the movement; and,
actuating automatically each jack of the plurality of adjustable jacks between a retracted condition and an extended condition, the extended condition selected from a plurality of different predetermined extended conditions and in dependence upon the determined alignment status,
wherein determining automatically an alignment status comprises detecting an operator control panel being one of powered down and disabled.

13. A method according to claim 12, wherein the determined alignment status is indicative of the aircraft-engaging end of the passenger boarding bridge being aligned with the doorway.

14. A method according to claim 13, comprising selecting a predetermined extended condition such that the drive wheels are elevated out of contact with a ground surface that is disposed elevationally below the passenger boarding bridge.

15. A method according to claim 12, wherein the plurality of adjustable jacks, when in any one of the plurality of different predetermined extended conditions, co-operate to provide a support-base for the passenger boarding bridge that is wider than a support-base provided by the drive wheels.

16. A method according to claim 6, wherein the plurality of adjustable jacks, when in the extended condition, co-operate to provide a support-base for the passenger boarding bridge that is wider than a support-base provided by the drive wheels.

17. A method according to claim 6, wherein actuating automatically each jack of the plurality of adjustable jacks between the retracted condition and the extended condition translates into elevating the drive wheels out of a ground-engaging condition.

18. A method according to claim 6, wherein the aligned relationship relates to alignment, along a direction of travel of the drive wheels, of the aircraft-engaging end of the passenger boarding bridge relative to the doorway of the aircraft.

19. A method according to claim 18, wherein the aligned relationship further relates to a height of the aircraft-engaging end of the passenger boarding bridge relative to a sill-height of the doorway of the aircraft.

20. A method according to claim 6, wherein detecting automatically the aligned relationship between the aircraft-engaging end of the passenger boarding bridge and the doorway of the aircraft comprises receiving a signal from a sensor disposed proximate the aircraft-engaging end of the passenger boarding bridge, the signal indicative of one of a close approach to and contact with an outer surface of the aircraft.

* * * * *